United States Patent [19]

Anderson et al.

[11] 3,736,566

[45] May 29, 1973

[54] CENTRAL PROCESSING UNIT WITH HARDWARE CONTROLLED CHECKPOINT AND RETRY FACILITIES

[75] Inventors: David W. Anderson, Poughkeepsie; Richard N. Gustafson, Hyde Park; Lance H. Johnson; Francis J. Sparacio, both of Poughkeepsie; William M. Tomas, Saugerties; James J. Webster, Wappingers Falls, all of N.Y.

[73] Assignee: International Business Machines Corporation, Armonk, N.Y.

[22] Filed: Aug. 18, 1971

[21] Appl. No.: 172,804

[52] U.S. Cl. ............................340/172.5, 235/153 A

[51] Int. Cl. ............................G06f 11/04

[58] Field of Search ............................340/172.5; 235/153 R, 153 A

[56] References Cited

UNITED STATES PATENTS

| | | | |
|---|---|---|---|
| 3,518,413 | 6/1970 | Holtey | 340/172.5 X |
| 3,533,082 | 10/1970 | Schnabel et al. | 340/172.5 |
| 3,593,297 | 7/1971 | Kadner | 340/172.5 |
| 3,618,042 | 11/1971 | Ryoji Miki et al. | 340/172.5 |
| 3,654,448 | 4/1972 | Hitt | 340/172.5 X |

*Primary Examiner*—Paul J. Henon
*Assistant Examiner*—Melvin B. Chapnick
*Attorney*—Robert W. Berray, William N. Barret, Jr. and J. Jancin, Jr.

[57] ABSTRACT

A data processing system with a central processing unit (CPU), main store (MS), and high speed storage (HSS) interposed between the CPU and store. The CPUhas a high degree of overlap and pipelining. That is, a plurality of instructions are buffered and predecoded through several stages prior to issuance to individual execution units where further instruction and operand buffering takes place. The execution units may be highly pipelined, wherein succeeding instructions can be issued to the execution unit prior to the completion of execution of a prior instruction. Additional hardware is added providing the ability to periodically establish a checkpoint which stores a minimum amount of CPU status information to permit processing to proceed with a plurality of instructions with the ability to cause the CPU to re-establish all of the data operated on and the status at the time the checkpoint was made.

7 Claims, 12 Drawing Figures

Patented May 29, 1973 3,736,566

8 Sheets-Sheet 1

INVENTORS
DAVID W. ANDERSON
RICHARD N. GUSTAFSON
LANCE H. JOHNSON
FRANCIS J. SPARACIO
WILLIAM M. TOMAS
JAMES J. WEBSTER

BY [signature]
ATTORNEY

CENTRAL PROCESSING UNIT WITH HARDWARE CONTROLLED CHECKPOINT AND RETRY FACILITIES

BACKGROUND OF THE INVENTION

1. Field of the Invention

This invention relates to data processing systems and more particularly to large data processing systems with a high degree of overlap in instruction decoding and execution with the ability to retry an entire instruction sequence to provide precise interrupts and recovery from intermittent hardware generated errors.

2. Description of the Prior Art

In both large and small data processing systems, techniques have been devised to prevent intermittent error conditions in the system from causing the system to be stopped. In order to accomplish this, means have been provided to save information existing at the beginning of an operation being performed by the system so that if an error occurs during the particular operation, the original status of the system can be restored and the operation performed one or more times on the assumption that subsequent attempts at the operation will produce correct results.

When the retry facility is provided for a small data processing system, that is one where there is not a high degree of instruction decoding overlap or execution overlap, the saving of data and CPU status is initiated prior to or during the processing of each instruction in an instruction sequence. A series of patents, all assigned to the assignee of this application, can be referred to for descriptions of various techniques of individual instruction retry capability. These are:

U.S. Pat. No. 3,533,065 — "Data Processing System Execution Retry Control," by B. L. McGilvray et al., Filed — Jan. 15, 1968, Issued — Oct. 6, 1970.

U.S. Pat. No. 3,533,082 — "Instruction Retry Apparatus Including Means For Restoring The Original Contents Of Altered Source Operands," by D. L. Schnabel et al., Filed — Jan. 15, 1968, Issued — Oct. 6, 1970.

U.S. Pat. No. 3,539,996 — "Data Processing Machine Function Indicator," by M. W. Bee et al., Filed — Jan. 15, 1968, Issued — Nov. 10, 1970.

U.S. Pat. No. 3,564,506 — "Instruction Retry Byte Counter," by M. W. Bee et al., Filed — Jan. 17, 1968, Issued — Feb. 16, 1971.

None of the above mentioned patents provide a technique suitable for use in a large data processing system with a high degree of instruction handling and execution overlap and therefore it is an object of this invention to provide a retry capability for such a large data processing system. The invention permits the handling of precise interrupts, which would otherwise be imprecise and permits the recovery to a known CPU status and data condition even though a plurality of instructions have been decoded, issued, and executed since the recording of status information.

Instead of providing special hardware for the purpose of establishing a known data processing system status and data condition, programming techniques have been provided for this purpose. That is, as a data processing system is operating on a particular program, periodic instructions are inserted into the program for the purpose of storing, on an auxiliary storage device, predetermined status information and data values. Should an error occur subsequently in the execution of the program, an error handling program will be capable of retrieving from the auxiliary storage the previously recorded information for the purpose of retrying the entire instruction sequence subsequent to the previous status and data recording.

In order to provide a checkpoint, or recorded state to which a data processing system can return after executing a number of instructions in a program without requiring a substantial amount of instruction fetching and execution time only for the purpose of recording status, it is another object of this invention to provide a checkpoint, recovery, and retry capability which is entirely hardware controlled and does not significantly reduce the operating efficiency of the data processing system.

Descriptive References

The preferred embodiment of the present invention is shown as being implemented in a large data processing system having an architecture associated with the IBM System/360. This architectural is disclosed in the following patent:

A. U.S. Pat. No. 3,400,371 — "Data Processing System," by G.M. Amdahl, et al., Filed — Apr. 6, 1964, Issued — Sept. 3, 1968.

The particular large system to which the present invention relates is a system having a high degree of instruction buffering, instruction decoding overlap, and instruction execution overlap and is described in the following U.S. Patents:

B. U.S. Pat. No. 3,449,723 — "Control System For Interleave Memory," by D. W. Anderson, et al., Filed — Sept. 12, 1966, Issued — June 10, 1969.

C. U.S. Pat. No. 3,462,744 — "Execution Unit With A Common Operand And Resulting Bussing System," by R.M. Tomasulo et al., Filed — Sept. 28, 1966, Issued — Aug. 19, 1969.

D. U.S. Pat. No. 3,490,005 — "Instruction Handling Unit For Program Loops," by D. W. Anderson, et al., Filed — Sept. 21, 1966, Issued — Jan. 13, 1970.

A preferred environment for the present invention also includes a small, high speed buffer, for recently used data, interposed between the main storage device and the central processing unit and which is disclosed in the following U.S. Patent:

E. No. 3,588,829 — "Integrated Memory System With Block Transfer To A Buffer Store," by L.J. Boland, et al., Filed — Nov. 14, 1968, Issued — June 28, 1971.

All of the above cited patents are assigned to the assignee of the present invention and the subject matter contained therein is hereby incorporated by reference thereto.

BRIEF DESCRIPTION OF THE INVENTION

The present invention is incorporated in a large data processing system which includes a main storage (MS) device having addressable locations for data, a small high speed storage (HSS) which retains the most recently used data accessed from the main storage device, into which and from which all data is transferred by a central processing unit (CPU) which includes an instruction unit (IU) and execution unit (EU). The instruction unit includes a number of instruction buffer registers, instruction decoding mechanism, and means for transferring decoded instructions to the execution unit. Also included is a program status word (PSW) which includes, as a portion thereof, an instruction counter (IC) specifying the next instruction to be decoded. The execution unit is shown to include a number of functional units which can be operating in parallel. These include arithmetic capability for fixed point arithmetic, floating point arithmetic, and variable field length processing. Each of the functional units has a capability of buffering a number of instructions for execution and the operands necessary for the specified operation.

In accordance with the IBM System/360 architecture, also included in the data processing system are a number of addressable registers. These addressable registers include 16 general purpose registers (GPR), and four registers for retaining floating point numbers (FPR).

In accordance with the present invention, additional hardware is added to the above recited general configuration of a large data processing system. This additional hardware includes temporary storage means for the purpose of recording the necessary data processing system status information and data operand values to permit the data processing system to recover and return to a condition where the status of all control functions and data are known to be correct for the purpose of retrying a series of data processing instructions. The temporary storage includes a register for each of the floating point registers and general purpose registers. A predetermined number of registers are provided for storing a predetermined number of operands and the associated identifying address information of data in the main storage. Also included is a register for storing an instruction counter value and a register for storing status information specified by the PSW, as required.

It is a primary feature of the present invention that the temporary storage associated with the floating point, general purpose, or main storage registers will only be utilized for the storage of data operands which are modified during the processing of instructions. That is, prior to the time that any CPU register which has an associated temporary register or main storage location is stored into or modified, the original contents of the register or main storage location is placed in the temporary storage. If the data processing system must recover to some known condition, the original contents of these registers or main storage locations can be made to reflect the value of the operands at the time of the known condition.

The general technique utilized in the present invention is to establish a known, correct condition of the data processing system to be identified as a checkpoint. To establish the checkpoint condition, instruction decoding is terminated, all instructions previously issued to the execution unit are completely executed, that is the entire pipeline of the execution units and instruction buffering is drained until it is known for certain the next instruction to be decoded and executed is the one identified by the instruction counter. At this point, the contents of the instruction counter are transferred to an instruction counter backup register along with any other status information provided by the PSW. The temporary storage registers are all cleared in preparation for receiving the original contents of associated CPU registers or main storage locations as subsequent instruction processing proceeds. Based on a number of design choices, any number of normal data processing system conditions can be detected for specifying when a checkpoint is to be taken.

As subsequent instruction processing proceeds, and various floating point, general purpose, or main storage registers are stored into, the original contents of these registers are placed in the temporary storage along with means for identifying those CPU registers which have been modified. As instruction processing proceeds, a number of abnormal data processing system conditions can be specified which are to direct the data processing system to recover to the previous checkpoint condition for subsequent retry of the instruction sequence. When any of the abnormal conditions are detected, the CPU or main store registers which have been modified during the processing are restored with the original contents of the data operands from the temporary storage. The originally saved instruction counter value at the point of creating the checkpoint, is transferred back to the instruction counter such that the entire instruction sequence which is to be retried can then be initiated with the original data processing system condition and data operand values.

During normal instruction sequence processing, a great deal of overlapped operation is accomplished as previously mentioned. During this processing, a number of abnormal conditions can arise which would create an interrupt condition in the data processing system. Because of a high degree of overlap, it is impossible in many cases to determine the precise cause of the interrupt condition and therefore large data processing systems with a high degree of overlap produce what is known as an imprecise interrupt. It is a particular feature of this invention that the data processing system can be made to recover to the known condition and operand values and cause the system to enter into a special condition wherein instructions are decoded and executed on an individual basis instead of in an overlap fashion. When the interrupt condition again arises, it will be known for certain which instruction and under what data processing conditions created the interrupt, and it therefore becomes precise for easier handling by subsequent routines for handling interrupt conditions. If the need for recovery was a hardware intermittent error condition, the retry may result in correct operation and normal processing can continue without further interruption.

Another desirable feature of the present invention relates to the handling of input/output operations. Normally, input/output instructions must be decoded and various control information transferred to and from the input/output handling mechanism. Further data processing by the CPU must be halted in order to determine whether or not the specified input/output operation can be performed. The CPU would normally wait for the setting of condition codes within the CPU before proceeding with further processing. This becomes wasted time for the central processing unit. With the present invention, the decoding of an I/O instruction creates a checkpoint, the CPU proceeds with processing based on an assumed condition code to be returned by the I/O device. When the I/O device returns the actual condition code to the system, a check is made to determine whether or not it is the condition code assumed. If it is not, the CPU can utilize the checkpoint retry mechanism to recover to the previously known condition and proceed to handle the I/O function based on the actually returned condition code.

These and other features, the nature of the present invention and its various advantages, will be readily understood by the attached drawings and by the following detailed description of those drawings.

FIGS. **4*a* through 4*e*** are a flow chart describing the conditions and sequence of the logic for performing a checkpoint, recovery, and retry of processing.

FIGS. **5*a* through 5*d* show detailed logic for accomplishing the logic and sequence specified in FIGS. 4*a* through 4*e***.

DETAILED DESCRIPTION

Figure 1:
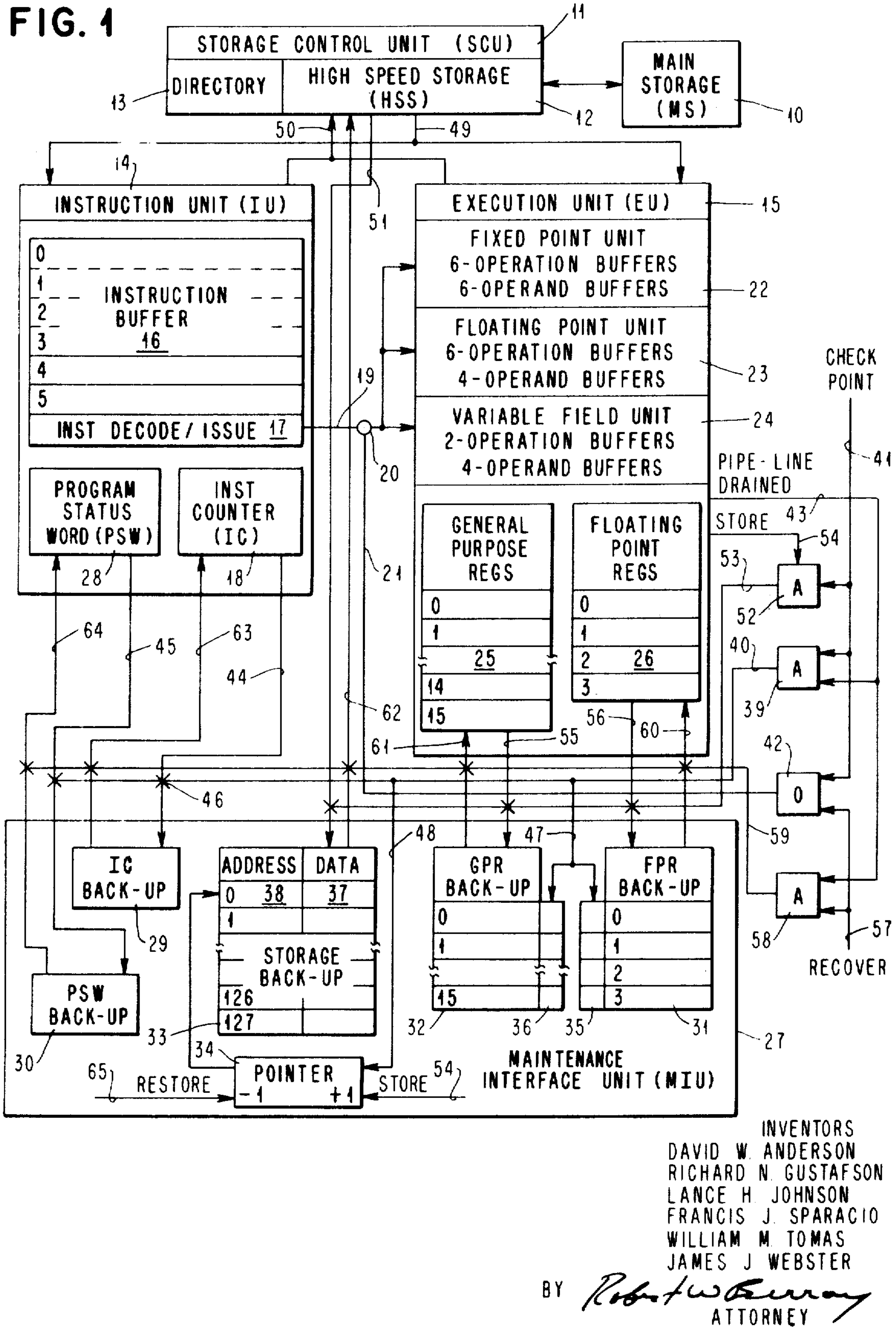
FIG. 1 is a block diagram of the major portions of a data processing system including temporary storage for practicing the present invention.

The basic data processing system for which the present invention is especially adapted in shown in FIG. 1. The standard units of the system, all of which are described in the above mentioned references A through E include a storage system comprised of a main storage (MS) 10 and a storage control unit (SCU) 11. The SCU 11 includes a relatively small high speed storage (HSS) 12 and an associated directory 13. An instruction unit (IU) 14 and an execution unit (EU) 15 apply address information to the SCU 11 for the purpose of fetching data from the storage system or for storing new data into the storage system. The operation of HSS 12 and directory 13 in connection with the main storage 10 and IU 14 or EU 15 is described in the above mentioned reference E. Generally, any address applied to SCU 11 which requests access to a particular location in main store 10 is first utilized to search the directory 13 to determine whether or not the requested data has been previously transferred to HSS 12. If it has, the CPU will operate immediately on the data in the HSS 12. If the data has not previously been transferred from MS 10, a portion of the applied address is utilized to transfer a block of data, including the requested data, from MS 10 to a location in HSS 12.

In a preferred embodiment of the present invention, every access for data by the CPU will require the data to be in HSS 12. That is, whether the CPU provides a main store address for the purpose of obtaining data to operate on or for designating a main storage location to be stored into, the block of data containing the accessed operand must reside in HSS 12. This technique, in connection with buffer/backing store environments is known as "store in buffer." This distinguishes from an alternative technique known as "store through" wherein an excess by the CPU for storing data invariably requires that the data in MS 10 be stored into so that MS 10 always contains the most recent version of any piece of data in the system.

The operation of the instruction unit (IU) 14 and execution unit (EU) 15 are essentially the same as that shown in the above mentioned references B, C, and D. In the IU 14, six registers comprise an instruction buffer 16 and are kept filled by instruction fetches and present instructions to an instruction decode/issue portion 17 by an instruction counter (IC) 18. Instructions are decoded, address arithmetic accomplished, and in accordance with various interlocks, instructions are issued to the EU 15. Not shown in the drawing, is a simple instruction issue counter for providing a count of instructions issued to the EU 15.

As represented in FIG. 1, the decoded instructions are transferred to EU 15 on a bus 19. The symbol at 20, to be more fully discussed subsequently, is an inhibiting means under control of the line 21 which will inhibit further instruction decoding and issuing by the instruction decode/issue mechanism 17.

Although not necessary to an understanding of the present invention, but which points out the usefulness of the invention, is the fact that the EU 15 is comprised of several separate arithmetic functional units including a fixed point unit 22, a floating point unit 23, and a variable field unit 24. All of these various units, as indicated in FIG. 1, have the ability to buffer a plurality of operation controlling signals responsive to instructions transferred from IU 14. Also, each of the arithmetic functional units has the ability to buffer a number of operands. As long as any of the arithmetic functional units can receive instructions from IU 14, they will be decoded and issued by IU 14. Therefore, at any particular instant of time, a rather large number of instructions in a program sequence will be in various stages of decoding and execution pointing up the difficulties that could arise when any one of these instructions creates an interrupt or error condition which must be handled by the data processing system.

Also as a standard part of the central processing unit, in accordance with the IBM System/360 architecture, defined in reference A, are a number of addressable registers for providing address information to the IU 14 and data to various of the arithmetic units in the EU 15. These registers include 16 general purpose registers 25, and four floating point registers 26.

In addition to the above described units of a data processing system, the present invention is shown embodied in a maintenance interface unit (MIU) 27. The MIU 27 performs many maintenance, diagnostic, and error recovery functions in addition to assisting in the checkpoint/retry functions in accordance with the present invention. Shown in the MIU 27 are a number of registers for the temporary storage of various control information and data during the execution of a sequence of instructions by the central processing unit. It is the general function of the checkpoint operation of the present invention to establish a known condition in the data processing system to which the entire system can be returned should the necessity arise. This checkpoint condition establishes in the MIU 27 the status of the data processing system as represented by the instruction counter 18 and the program status word 28 in the IU 14. The program status word (PSW) reflects a number of conditions of the data processing system including condition codes, masks for various interrupt conditions, and also includes the instruction counter 18 value indicating the starting point of an instruction sequence wherein no instructions have previously been decoded or issued. At the time of the checkpoint, the contents of the instruction counter 18 are transferred to an instruction counter (IC) backup register 29 and any other desired status information as represented by the PSW 28 is transferred to a PSW backup register 30.

The contents of the IC backup 29 and PSW backup 30 establish all the status information necessary to signify a particular instruction to be decoded and issued at the time a checkpoint was taken. The time at which a checkpoint is to be taken is dictated by a number of specified normal conditions of the data processing system.

When the checkpoint has been established, the instruction decode/issue mechanisms 17 will proceed to cause a sequence of instructions to be forwarded to the EU 15 for execution. A previously mentioned feature of the present invention is the fact that the only data which need be retained for the purpose of recovering to the checkpoint and retrying, are the original contents of main storage locations and the original contents of the general purpose registers or floating point registers. For this purpose, the MIU 27 is shown to include four floating point registers (FPR), backup registers 31, 16 general purpose registers (GPR), backup registers 32, and 128 main storage backup registers 33. A pointer 34 controls the entry of information into and out of the storage backup registers 33.

As indicated earlier, the backup registers receive, during normal instruction processing, the original contents of any GPR, FPR, or MS location which is stored into during processing. The means by which the identity of the CPU registers is indicated, is by means of valid bits 35 associated with the FPR backup registers 31, and valid bits 36 associated with each of the GPR backup registers 32. In the case of the storage backup registers 33, each register has one portion 37 for data and another portion 38 which is the main store address of the data which has been stored into.

The general philosophy of the present invention, which includes creating a checkpoint and providing the means to recover to the checkpoint, will be shown in connection with FIG. 1. A logical decision is represented by an AND circuit 39 which signals on a line 40 the fact that a normal condition has been signified on a line 41 indicating the need for a checkpoint. The signal on line 41 is also effective at an OR circuit 42 to indicate on line 21 that the inhibit mechanism 20 should prevent any further instruction decoding or issuing by the mechanism 17. When further instruction decoding and issuing has been stopped, the various arithmetic functional units of the EU 15 will proceed to complete the instructions previously buffered. When all of the instructions previously forwarded to the EU 15 have been completed, a signal on a line 43 will indicate that the instruction execution pipeline has been drained and that all instructions previously issued on a line 19 have been executed. At this point in time, AND circuit 39 will provide a signal on line 40 indicating that the present condition of the instruction counter 18 and PSW 28 reflects a known condition of the system. The control signal 40 will be effective to transfer the instruction counter 18 contents to the IC backup 29 on a transfer bus 44 and will transfer the PSW 28 to the PSW backup 30 on a transfer bus 45. The symbol shown at 46 is a representation of a gating mechanism to initiate this transfer. AND circuit 39 will also be effective on signal line 47 to reset the valid bits 35 and 36 and on line 48 to reset the pointer 34. This has the effect of clearing the contents of the FPR backup registers 31, GPR backup registers 32, and the storage backup registers 33. In accordance with further logic to be discussed, the inhibiting action at 20 on the instruction decode/issue mechanism 17 will be removed and further instruction processing will proceed.

During the processing of an instruction sequence of a program by the data processing system, accesses to data from MS 10 must be in HSS 12 at the time of access, and is transferred to and from the IU 14 and EU 15 by data busses 49 and 50. For every access to data by the data processing system, whether it is for the purpose of reading data or storing data, the address information of a location effected is applied to the directory 13 to determine whether or not the data is contained in HSS 12. As a function of this operation, as described in the above mentioned reference E, the search of the directory 13 is combined with an initial selection of the HSS 12. Therefore, when data is to be stored into a location in HSS 12, the original contents of that location will be available in an output register and useable. When a location of HSS 12 is to be stored into, the original contents of that location will be available on a bus 51. Another AND function accomplished during the operation of the data processing system is represented at AND circuit 52. This AND function provides an output signal on a control line 53 when the system is processing instructions after a checkpoint as indicated on line 41 and a decoded instruction signals the fact that a storing operation will be taking place as signalled on a line 54. The control signal 54 will be generated whenever data is being stored into HSS 12 or into the general purpose registers 25 or floating point registers 26.

When the storage operation is into HSS 12, the data on the bus 51 will be gated by the control signal 53 into the storage backup registers 33. The information gated into the storage backup registers 33 will be the data and associated address of the data which is entered into portion 38 of the register. The pointer 34 is initially reset to point to location 0 of the storage backup registers 33. In response to each store signal 54 at the input of the pointer 34, the pointer 34 will be incremented and point to the next succeeding storage backup register. The storage backup registers 33 will receive, in sequential locations, the original contents and the associated addresses of main storage address locations which had been stored into since the taking of a checkpoint.

In the case of any store operation into the general purpose registers 25 or floating point registers 26, the control signal 53 from AND circuit 52 will be effective to transfer the original contents of the registers to an associated and corresponding backup register 32 or 31 respectively on transfer busses 55 and 56. As the data is transferred to the backup registers, the valid bit 35 or 36 associated with the register 31 or 32 respectively being loaded with the original contents of the registers, will be set to reflect those registers which have been stored into since the taking of the checkpoint. The setting of the valid bits is done only on the first store into a particular register. Subsequent stores to an already modified register will not change the contents of the backup register, this being prevented by the existence of the valid bit being previously set.

If it is assumed that processing of a number of instructions in a program sequence takes place correctly, the storage backup registers 33 may approach a condition where it is about to be completely filled. This is one normal condition which creates the checkpoint on signal 41 and will cause instruction issuing to be inhibited and, once a pipeline drain has been accomplished, will reset all the valid bits 35 or 36 and will reset the pointer 34 to 0. Also, the contents of the instruction counter 18 and PSW 28 will be transferred to backup registers 29 and 30 respectively to create a new starting point for any subsequent requirement of a recovery and retry.

Subsequent to the taking of a checkpoint, and after a number of instructions have been decoded and issued, a number of abnormal conditions will cause a signal to be generated on a line 57 indicating the need to recover and return the data processing system to the status it had at the time the checkpoint was taken. The signal on line 57 will be effective at the OR logic block 42 to generate the signal on line 21 effective at the inhibiting means 20 to prevent further instruction decoding and issuing. An AND circuit 58 is provided to reflect the logical situation where a recovery is required, as signalled on lines 57, and an indication that all instructions previously issued have been executed as indicated by the pipeline drain signal 43.

The signal produced on line 59 from AND circuit 58 will be effective to initiate the transfer of the original contents of any registers that had been stored into subsequent to the checkpoint. Bus 60 transfers original data back to the floating point registers 26 which have been modified as indicated by the valid bits 35. Bus 61 transfers the original contents of general purpose registers 25 as indicated by valid bits 36. Bus 62 transfers original data from storage backup registers 33 to their proper location as indicated by the address information 38. Bus 63 transfers the instruction counter value which existed at the time of the checkpoint to IC 18. The PSW information is transferred on a bus 64 back to the program status word registers 28. The pointer 34 will be decremented by 1 each time a piece of data is transferred from the storage backup registers 33 to HSS 12 by means of a signal on line 65 during the restore operation.

In summary of the general operation of the checkpoint retry, the instruction counter and program status information is saved at a checkpoint condition to indicate a starting point if retry is necessary. During subsequent instruction processing, the original contents of any main store location or addressable registers are saved in temporary storage. Subsequent to a checkpoint, a recovery situation may be signalled whereby the original contents of the previously modified registers will be returned to the appropriate registers and the instruction counter and program status information will be returned to the instruction fetching mechanism to initiate a retry of the previous instruction sequence.

Figure 2:
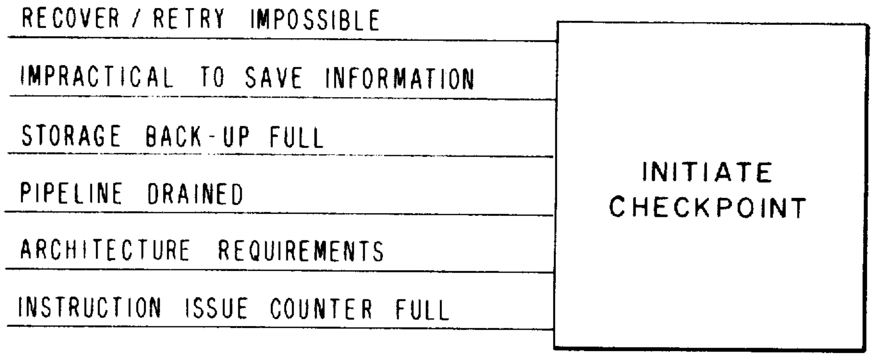
FIG. 2 identifies the normal conditions of a data processing system which specify when a checkpoint is to be taken.
Figure 3:
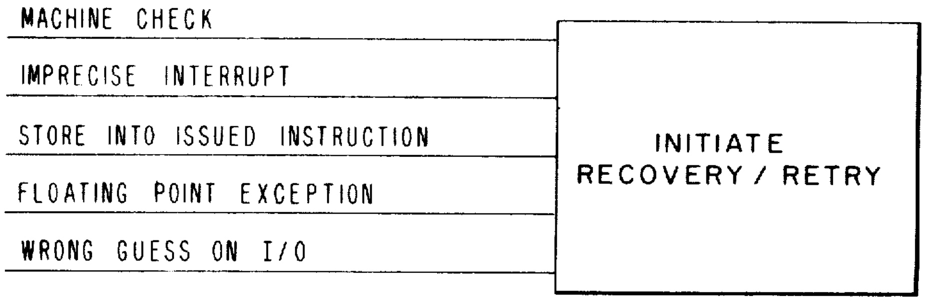
FIG. 3 identifies the abnormal conditions of a data processing system which initiate a recovery to the checkpoint and retry of the processing of instructions.

FIGS. 2 and 3 provide a representation for discussing general principles concerning the choice of normal data processing operations which will be utilized to signal a requirement for a checkpoint which involves draining the central processing unit pipeline and saving sufficient information to enable a recovery to that point.

In general, the decision to checkpoint arises out of consideration of the following factors as shown in FIG. 2:

A. Recovery/retry impossible — Certain CPU operations (such as I/O instructions and I/O and external interrupts) cannot be backed-up and/or retried without possible illogical consequences. Therefore, the decoding of an I/O initiating instruction or detection of interrupts including external and machine check, and requests by I/O channels for channel control words will initiate a checkpoint request. If processing were allowed to continue, the result of responding to the various action specified could modify data in such a way that it would be impossible to restore the system to some previous checkpoint condition and permit retry and achieve the same results.

B. Impractical to save information — In some cases, it may be judged impractical to save the information necessary to restore to a checkpoint and/or retry. In the present system, the design decision was made to save a predetermined number of main storage operands, the general purpose registers, and floating point registers between checkpoint conditions. Other control registers or data may be present in the system, such as storage protect keys and other control registers which may be modified during instruction processing. If back-up registers had been provided, when modified, these registers would not need to create a checkpoint. However, since back-up registers were not provided, if any of this control information is modified by any operation of the CPU, the system is caused to establish a checkpoint.

C. Storage Back-up Full — By design choice, the number of registers provided to retain the original contents of main storage locations has been chosen as 128. Therefore, a checkpoint must be taken when this buffer becomes full or has insufficient capacity to totally record the possible stores for an operation which may include a multiplicity of stores.

D. Pipeline drain — A convenient point at which to create a checkpoint may be developed from simple hardware algorithms. For example, whenever the pipeline empty condition occurs, for whatever reason, a checkpoint can be initiated. A pipeline drain will occur for various interrupt conditions not previously mentioned and, depending on the architecture of any highly overlap system, may be a number of instruction executions which for their proper functioning require an accurate starting point.

E. Architecture requirements — In order to accomplish any architecturally specified results under certain specified conditions, a checkpoint can be established such that the desired machine state can be reached by recovery to the checkpoint. For example, there may be a requirement to honor I/O interrupt requests, and creating a pipeline drain during a checkpoint prevents higher priority interrupts from preventing the acknowledgement of the I/O interrupt request. Also, in certain instruction executions, the architecture may specify that should an interrupt condition occur during the execution of the instruction, the instruction is to be suppressed. That is, the system is to reflect a condition as though the instruction had never begun execution.

F. Instruction issue counter full — If the above reasons occur infrequently, such that large numbers of instructions are executed between checkpoints, the time to recover and retry could become excessive. This problem is avoided by specifying some maximum value in the issue counter, which counts the number of instructions decoded and issued to the execution unit.

FIG. 3 is a general representation of certain conditions in the data processing system which can be classified as abnormal and which will signal the need to recover to the previously established checkpoint. That is, any registers or main storage locations that were modified must be restored to their original values from the backup registers and the instruction counter must be set to the value previously established in the backup instruction counter. The conditions considered to be abnormal in the present invention are:

A. A machine check detection

B. The detection of a "wrong guess" on an I/O instruction

C. The occurrence of an imprecise interrupt

D. The detection of a store into an issued instruction

E. The detection of a significance or exponent underflow exception during floating point operations when an interrupt mask condition prevents normal interrupt recovery from this condition.

In all cases, a trigger indicating the need for recovery and a trigger for indicating the need for a checkpoint are turned on causing the recovery sequence to occur followed by a checkpoint. In the case of a machine check, this happens after the reset of the system following the log out of all information required for diagnostics. In all other cases, turning on a trigger indicating the checkpoint enables the inhibiting means to prevent any further instruction decoding and issuance and the recovery sequence is initiated after the pipeline has drained.

As mentioned earlier, the rather extended amount of time required for an I/O interface to cycle in response to an I/O instruction can be overlapped with further instruction processing by creating a checkpoint for I/O operations. As indicated, a condition code is assumed by the CPU and further processing is resumed. If the condition code actually returned in response to the start I/O instruction is different from that assumed, the system must be made to recover. If the need for a recovery is the occurrence of an imprecise interrupt, and an I/O interrupt sequence was in process, the checkpoint sequence will be blocked from completion until after the I/O interrupt has been taken. The reason a recovery is required in this case is that the program interrupt could change the mask controlling the I/O interrupt to which the CPU is committed thereby resulting in an illogical situation.

The store into an issued instruction condition results when the I unit has fetched an instruction for subsequent decoding and execution and some previous instruction being executed causes that instruction to be modified by storing into a main storage. Therefore, to provide an accurate instruction for execution, the fetching of the instruction must be re-initiated.

The detection of floating point exceptions causes the floating point unit, during retry, to force an extra cycle at the end of the retry sequence enabling an architecturally defined O to be formed as the result.

FIGS. 4*a* through 4*e* depict sequences of operations and logic decisions which must be made to accomplish the functions generally discussed in connection with FIGS. 2 and 3. The turning on (TN) or turning off (TF) of various trigger circuits to initiate certain controls or other actions which must be taken are represented in the rectangular boxes. All other boxes in the flow chart represent decisions being made by logic and signals generated as a result thereof. With regard to FIG. 4*a*, the arrows on this drawing signify, for example, that an action to be taken will result if a decision is made along the line above an arrow head. As an example, a decision such as shown at 70 calling for a machine check recovery will effect blocks 71 and 72, but not block 73.

Figure 4A:
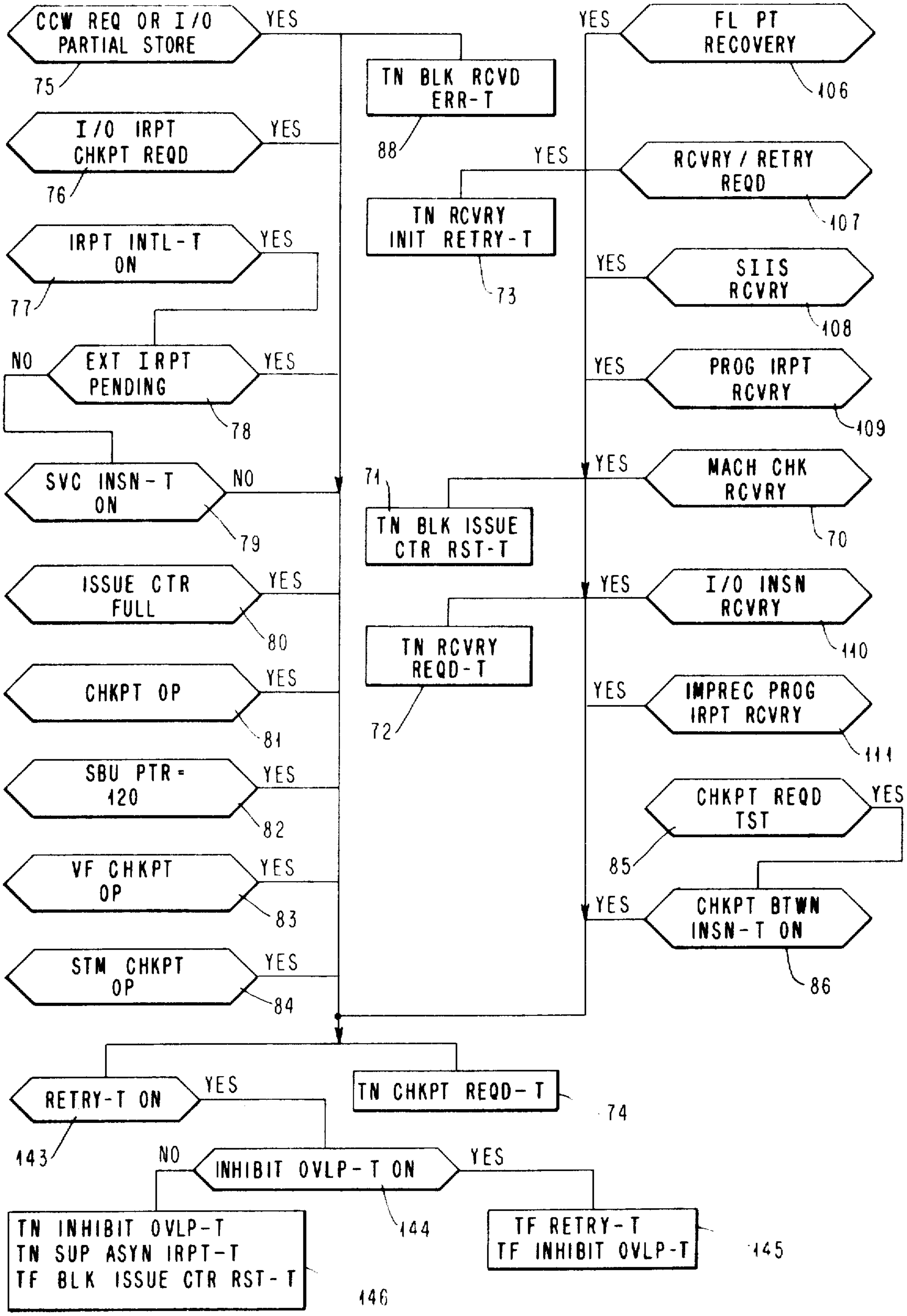

One of the basic actions taken in FIG. 4*a* is represented by block 74 in which there is the turning on of a checkpoint required trigger. Other basic blocks in FIG. 4*a* include the turn on of recovery initiate retry trigger 73, turn on block issue counter reset trigger 71, and turn on recovery required trigger 72. Blocks 75 through 86 represent decisions made in accordance with the basic philosophy in creating a checkpoint condition as outlined in connection with FIG. 2. These decisions and signals originate in various parts of the total data processing system. Block 75 represents the condition where I/O operations have requested a channel control word (CCW), and is a solution to the problem that arises in connection with creation of a program controlled interrupt from a channel. Unless a checkpoint is forced, it is possible that a recovery could cause the CCW's to be stored into on a recovery while the channel was actively working with it. The reason for checkpointing on an I/O partial store is to avoid the necessity of saving the System/360 architecturarily defined mask bits specifying which bytes of a full double word in storage have been stored into. Block 76 is also related to I/O operations and generates the need for a checkpoint for any I/O interrupt to prevent higher priority interrupts from preventing acknowledgement of the I/O interrupt. Blocks 77 through 79 handle situations on all other interrupt conditions which should create a checkpoint. If the data processing system recognizes an interrupt, it will turn on an interrupt interlock trigger represented by block 77. If the condition is an external interrupt as indicated by block 78, the checkpoint is created. If it is not an external interrupt condition, the determination is made as to whether or not it is a System/360 architecturarily defined supervisor call instruction (SVC) as represented by block 79. This instruction, which would normally create a checkpoint, is prevented from creating a checkpoint as it quite often follows an I/O instruction. As previously indicated, instruction processing is allowed to continue under an assumed condition code and not checkpointing on SVC allows instruction processing to proceed beyond the SVC instruction.

The previously mentioned issue counter which is designated to have a predetermined value for counting instructions decoded and issued to the execution unit will indicate the need for a checkpoint at block 80. Design considerations will indicate that if too many instructions are allowed to be issued, the time for recovery will be too long and reduce the effectiveness of the total system. Therefore, a predetermined count is set to force a checkpoint.

Block 81 represents any decoded instruction in which the operation specified will modify various control or stored data which by design choice has been decided not to place in a backup register.

Decision block 82 relates to the pointer 34 of FIG. 1 and specifies that condition wherein 120 locations of the storage backup 33 have been filled and that if all of the instructions in the pipeline of the execution units require stores of data, the storage backup will be completely filled. Therefore, when the pointer 34 reaches 120, a checkpoint is initiated. Decision blocks 83 and 84 relate to instructions which involve the handling of a variable number of data bytes and which extend over several words of main storage. In the case of block 83, a checkpoint is created between each word segment during a retry due to programming exceptions. Block 84 creates a checkpoint in response to further conditions indicated in FIG. 4*e*. These further signals are represented by block 87 of FIG. 4*e* where an indication is given that the pointer 34 of FIG. 1 has reached position 88 in the storage backup 33. If the pointer has a value of 88, and an instruction is decoded which requires the storage of a multiplicity of bytes, the storage backup will not have sufficient capacity to store the possible maximum number of data bytes in executing the store multiple instructions.

Blocks 85 and 86 relate to either a manual condition which can be established by an operator or when retry is being attempted as the result of the System/360 specification and address translation exceptions. In these situations, a checkpoint is created between each instruction.

As part of the maintenance philosophy of the data processing system incorporating the present invention, a trigger is provided as represented by block 88 which prevents the maintenance hardware from indicating that the system has recovered from some error condition. There will be the turning on of a block recovered error trigger as indicated at 88 in response to the signals provided by the decision blocks 75, 76, or 78. Without the block recovered error trigger 88, certain asynchronous interrupts occurring during a retry, might indicate that the retry facility has proceeded beyond a point which created the need for a retry. That is, an interrupt which would normally signal the requirement for a checkpoint would indicate that the data processing system had proceeded beyond the condition creating the retry and reflect proper operation. Asynchronous interrupts may occur during the retry operation, prior to the point in the instruction sequence which created the error. The turn on block recovery error trigger action represented by block 88 will reflect some new checkpoint requirement arising before the system has proceeded to the condition which gave rise to the original error.

Figure 4B:
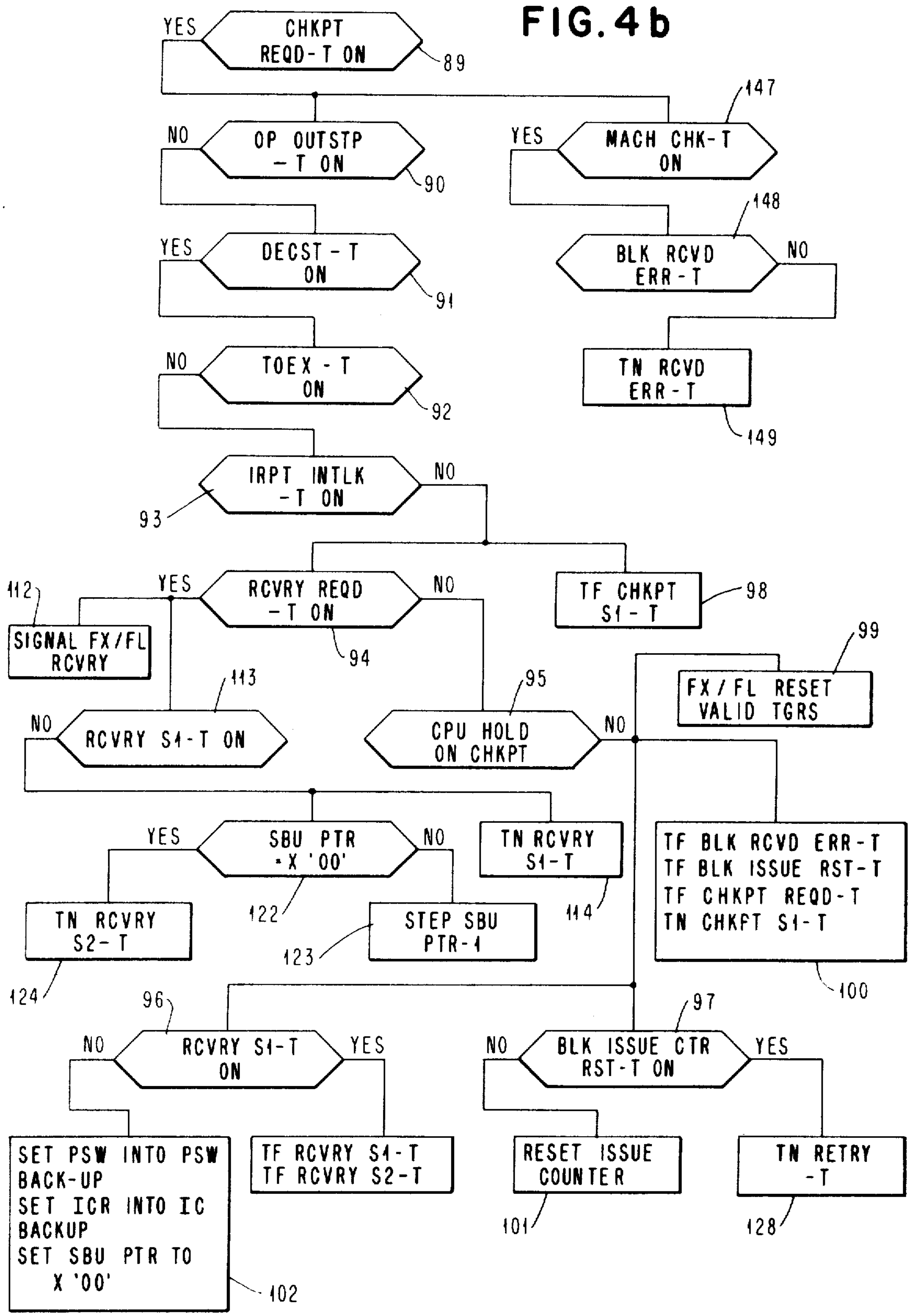

When the need for a checkpoint is indicated at block 74 by the previously mentioned conditions, all of which can be considered normal conditions, a sequence of decisions as represented in FIG. 4*b* by blocks 89 through 97 will be effective to reset the pointer 34 and valid bits 35 and 36 shown in FIG. 1 in preparation for setting into temporary storage the original contents of main storage registers, general purpose registers, and floating point registers subsequent to the creation of the checkpoint. Block 89 indicates the need for a checkpoint. Block 90 indicates that the pipeline is drained, that is, there are no operations outstanding in the execution units. Box 91, 92, and 93 indicate conditions in the I unit. That is, the I unit is in a decode state and is capable of decoding instructions (91). At 92, an indication is made that the I unit does not have any operations outstanding which are the target of an execute instruction (TOEX), and 93 indicates that the I unit is not then processing an interrupt condition.

At this point, a sequence trigger labeled checkpoint S1 is turned off as indicated at block 98. Block 94 indicates that there has been no signal indicating a recovery required and block 95 indicates that the central processing unit is not in a hold status for the purpose of finishing the processing of an I/O interrupt. At this point, as indicated at block 99, the fixed point and floating point valid bits 35 and 36 of FIG. 1 are reset.

Action taken as represented by block 100 includes turning off of the block recovered error trigger, the block issue counter reset trigger and the checkpoint required trigger. Turned on at this stage is the sequence trigger labeled checkpoint S1. As indicated at block 97, if the block issue counter reset trigger is not on, the issue counter will be reset as indicated at block 101.

The decision made at block 96 that the recovery S1 trigger is not on, causes the action shown at 102 and causes the PSW in the I unit to be inserted into the PSW backup 30 and the instruction counter set into the instruction counter backup 29 of FIG. 1. Pointer 34 is reset to zero to initiate the loading of the storage backup 33 at location zero.

Figures 4C, 4D, 4E:
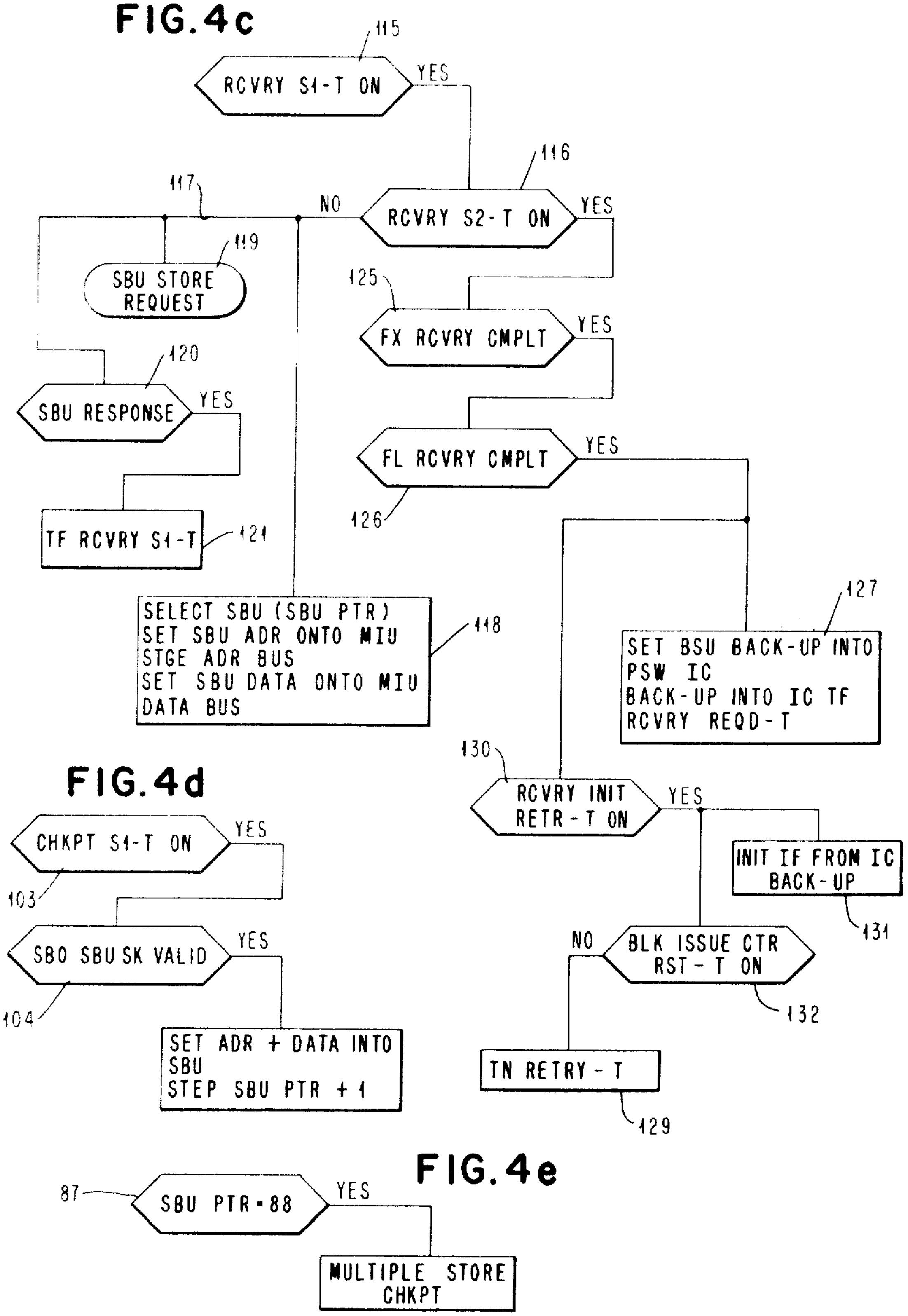

When the checkpoint S1 trigger was turned on at block 100, the decision shown in FIG. 4d represented by block 103 and 104 will be effective to set the address and data information into the storage backup 33 of FIG. 1 in accordance with the locations specified by the pointer 34 and the pointer 34 will be incremented by 1. Block 104 indicates that the data on the storage bus and at the input to the backup is valid.

As shown in FIG. 4*a*, the turning on of the recovery required trigger at 72 will be initiated by any of the decisions made in blocks 106 - 111 as well as the previously mentioned machine check recovery block 70. These decisions include the detection of a floating point exception with mask bits on (106), recovery/retry required (107) which is signalled by various logic decisions made in other portions of the maintenance interface unit, storage into an issued instruction (108), the generation of a program interrupt condition (109), machine check (70), indicating a hardware error condition, a wrong guess on the condition code for a start I/O instruction (110), and the signalling by the maintenance interface unit of an imprecise program interrupt (111).

The turning on of the recovery required trigger at 72 will have effect on the decision block 94 of FIG. 4*b*. The requirement for a recovery indicates that the data processing system is to be returned to the condition it had at the time of taking the last checkpoint. That is, any data that had been modified by store instructions is to be restored to its original value, the original PSW contents are to be returned, and the instruction counter value that existed at the time the pipeline was drained should be restored. Any of the conditions 70 and 106 - 111 will be effective at 74 of FIG. 4*a* to turn on the checkpoint required trigger. This initiates the sequence of operations previously discussed starting at block 89 in FIG. 4*b*. However, the decision at block 94 will now indicate that the recovery required trigger has been turned on. As a result of this signal, a signal will be generated to the fixed point unit and floating point unit that the recovery is required. In response to this signal, each of these units will proceed to restore the data in the general purpose registers 25 and floating point register 26 of the execution unit 15 of FIG. 1. The valid bits 35 and 36 of the backup registers 31 and 32 will be examined and the registers corresponding to registers having valid bits set will be restored to their original values. The signalling of the fixed and floating point unit is indicated at block 112 of FIG. 4*b*.

The next decision made is indicated at 113 wherein it is determined whether or not a sequence trigger labeled recovery S1 is on. If not, it is turned on at 114.

As part of the recovery procedure, the contents of the storage backup 33 must be returned to high speed storage 12 of FIG. 1 at the locations indicated by the address portion 38 of these registers. FIG. 4*c* shows the sequence which accomplishes this result. When the recovery S1 trigger 113 was turned on, the decision block 115 in FIG. 4*c* will provide the start of the recovery sequence. The next decision at 116 is whether or not the next trigger in the recovery sequence is on and is labelled recovery S2. At this point in time, recovery S2 will not be turned on providing an output of line 117. As indicated at 118, the pointer 34 is examined and the contents of the storage backup register 33 pointed to will be utilized. The address data will be provided on an address bus and the data will be provided on a data bus to the high speed storage 12 of FIG. 1. Each time data is placed on the address and data busses to the high speed storage, there will be a storage backup store request 119 and a response to that request 120 which will then turn off the recovery S1 trigger at 121.

The recovery required trigger on indication 94 of FIG. 4*b* will still exist, recovery S1 trigger 113 will now be off and thereby turned on at 114. Decision block 122 of FIG. 4*b* will be effective to signify whether or not the storage backup pointer 34 has been decremented to location zero. If it has not, as indicated at 123, it will be decremented by one and the sequence will return to block 115 of FIG. 4*c*. As the sequence proceeds and the pointer 34 has been stepped to location zero, the recovery S2 trigger 124 will be turned on.

In FIG. 4*c*, the decision at 116 indicating that the recovery S2 trigger has been turned on will initiate a sequence of decisions at 125 and 126 to indicate whether or not the fixed point and floating point units have completed the restoring of the general purpose and floating point registers. As indicated at 127, it is at this point in time that the contents of the PSW backup 30 will be restored to the program status word register 28 of FIG. 1 and the recovery required trigger will be turned off.

In the case of a wrong guess on an I/O instruction as indicated at 110 and an imprecise program interrupt as indicated at 111 of FIG. 4*a*, a new checkpoint is established. However, this checkpoint is a previously established checkpoint which is reached by the recovery process. Further processing will then be under control of the data processing system or more particularly the maintenance interface unit 27. The indication of a machine check at 70, is also effective to establish a checkpoint which is a previously established checkpoint. However, the machine check and all other conditions indicated by blocks 106 – 109 are effective to turn on a block issue counter reset trigger at 71. At the time of establishing the need for a recovery, the contents of the issue counter are maintained to indicate the number of instructions previously issued from the checkpoint condition until the need for a recovery arose. The maintenance interface unit can utilize the contents of the issue counter to permit the re-execution of an instruction sequence in an overlapped manner until some threshold value is reached at which point a trigger which controls whether or not processing is accomplished in an overlapped or a non-overlapped fashion can be turned on. This permits high speed instruction decoding, issuing and execution up to a point close to where an error occurred at which point processing will be accomplished in a non-overlapped fashion such that the exact state of the machine can be determined and sequence of operations followed for each individual instruction decoded, issued and executed. All of the decisions indicated in blocks 106 – 109 will be effective to not only create the checkpoint requirement, which is a previously established checkpoint, but will initiate a recovery process, turn on the block issue counter reset trigger, and turn on a recovery initiate retry trigger 73. The decisions 107 and 109 are decisions made by the data processing system logic or maintenance interface unit in response to such things as machine check errors and imprecise program interrupt indications.

When the recovery process has been completed, as indicated at 127 in FIG. 4*c*, the recovery required trigger is turned off. At this point in the sequence of operations, decision block 94 of FIG. 4*b* will indicate that this trigger is off and will proceed to the decision block 97 which determines the condition of the block issue counter reset trigger. In response to the above-mentioned conditions, the block issue counter reset trigger will be turned on and will cause the turning on of the retry trigger at 128 of FIG. 4*b*.

The other method of turning on a retry trigger is indicated in FIG. 4*c* at 129. After the recovery process has been completed, and if the recovery initiate retry trigger is on as indicated at 130, the I unit will initiate an instruction fetch from the instruction counter backup register 29 as indicated at 131. If the recovery process was initiated by the imprecise program interrupt indication 111 in FIG. 4*a*, the block issue counter reset trigger would not have been turned on (132), and the retry trigger is turned on as indicated at 129.

The remainder of the decisions and actions shown in FIGS. 4*a* and 4*b* relate to actions taken during the process of instruction retry. When the retry trigger has been turned on as indicated at 133 in FIG. 4*a*, the determination must be made as to whether or not the signalling of the need for a checkpoint at 74 is the result of the same error, a different error prior to reaching the instruction which created the initial need for retry, or that the system has proceeded beyond the instruction in the sequence which previously created an error condition. The key to this indication is the indication at 144 as to the condition of an inhibit overlap trigger. The condition of the inhibit overlap trigger is the responsibility of the maintenance interface unit which can cause any of the retry operations to be accomplished completely out of overlap or accomplish the function based on the previously mentioned actions of the issue counter. As retry proceeds, the issue counter will be decremented until it reaches some threshold value prior to the setting in which the retry was initiated at which point the overlap trigger will be turned on to cause processing out of overlap. If any of the signals are generated which create the need for checkpoint, and the overlap trigger had previously been turned on, the retry trigger and inhibit overlap trigger are turned off at 145. This provides an indication that the need for a checkpoint has been caused by a condition further on in the instruction sequence than the instruction which originally created the need for the retry.

If the retry trigger is on as indicated at 143, and the inhibit overlap trigger has not been turned on previously as indicated at 144, the system is signalled to the effect that a new interrupt or error condition has arisen prior to the instruction in the sequence which originally created the need for retry. Or, the new environment on the retry has caused the condition which initiated the retry to occur before the logic which places the system out of overlap has been enabled. In this case, as indicated at 146, the inhibit overlap trigger is turned on, a trigger which suppresses any asynchronous interrupt is turned on, and the block issue counter reset trigger is turned off to negate any effect it may have in the normal function of the maintenance interface unit. What results now, is that the retry process will be initiated for a second time completely out of overlap and will prevent any of the above-mentioned asynchronous interrupts from being recognized so that processing can proceed to the instruction which originally created the need for a retry.

The remaining logic shown in FIG. 4*d* relates to signalling the maintenance innerface unit for use in any further recording of error recovery techniques. The fact that the requirement for a checkpoint indicated at 89 has been generated by a condition arising beyond the point in the instruction sequence which had created a machine check error condition is indicated at 147 with a signal indicating that the machine check trigger is on. If the indication of the need for a checkpoint has not been created by any of the conditions that would turn on the block recovered error trigger at 88 of FIG. 4*a*, block 148 of FIG. 4*b* will signal that this trigger is not on permitting the turning on at 149 of the recovered error trigger in the maintenance interface unit.

Figure 5A:
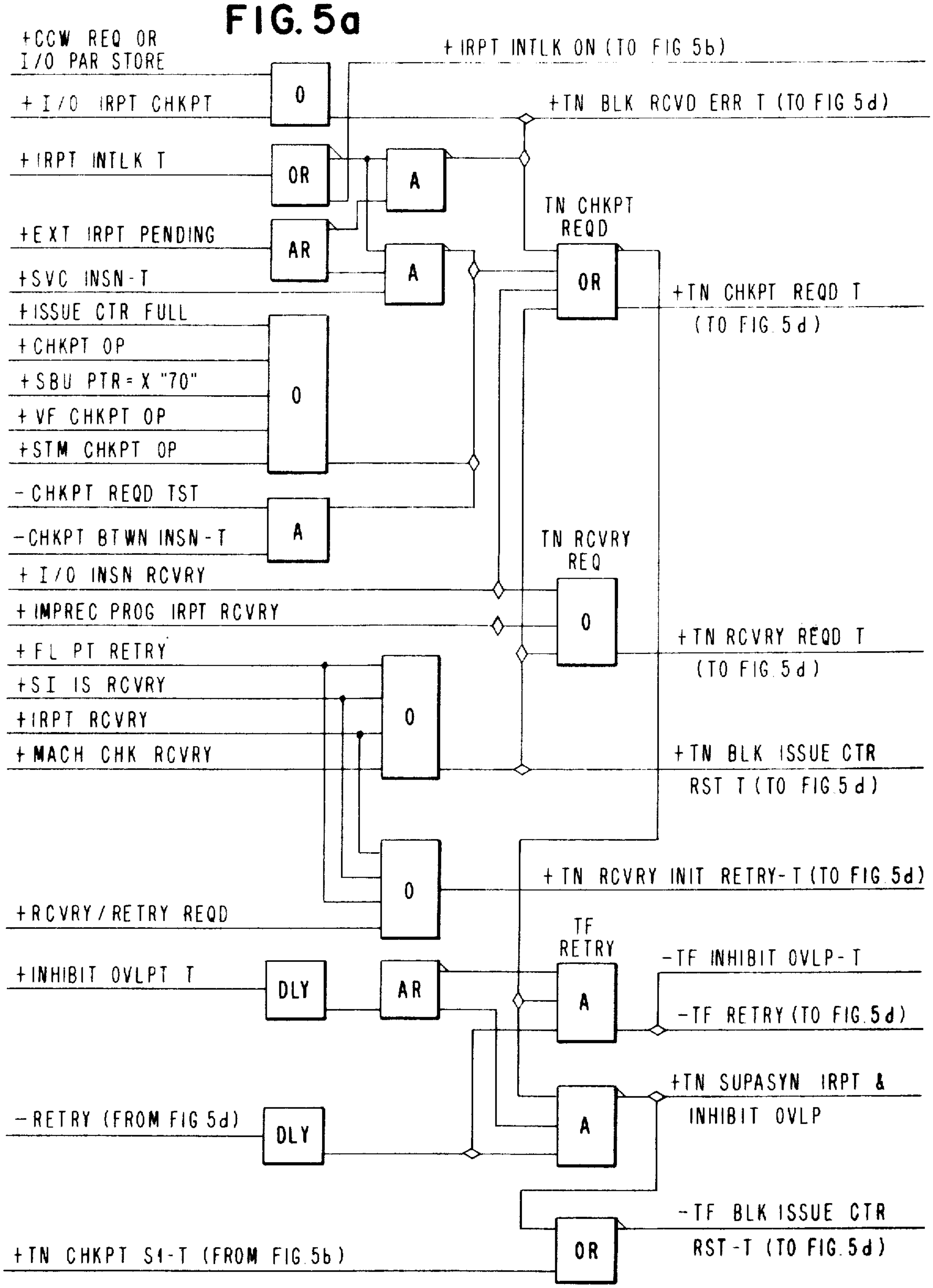
Figure 5B:
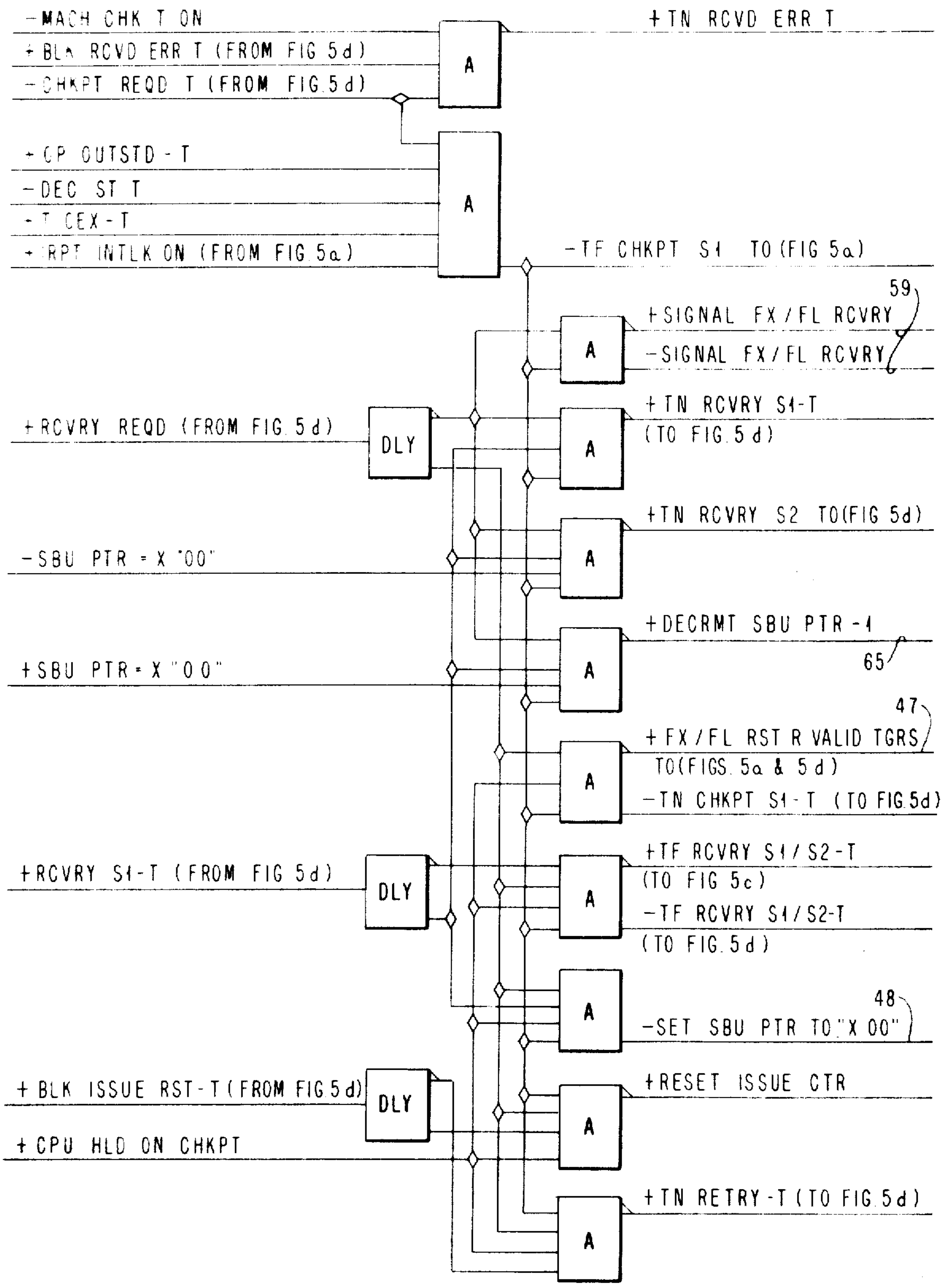
Figure 5C:
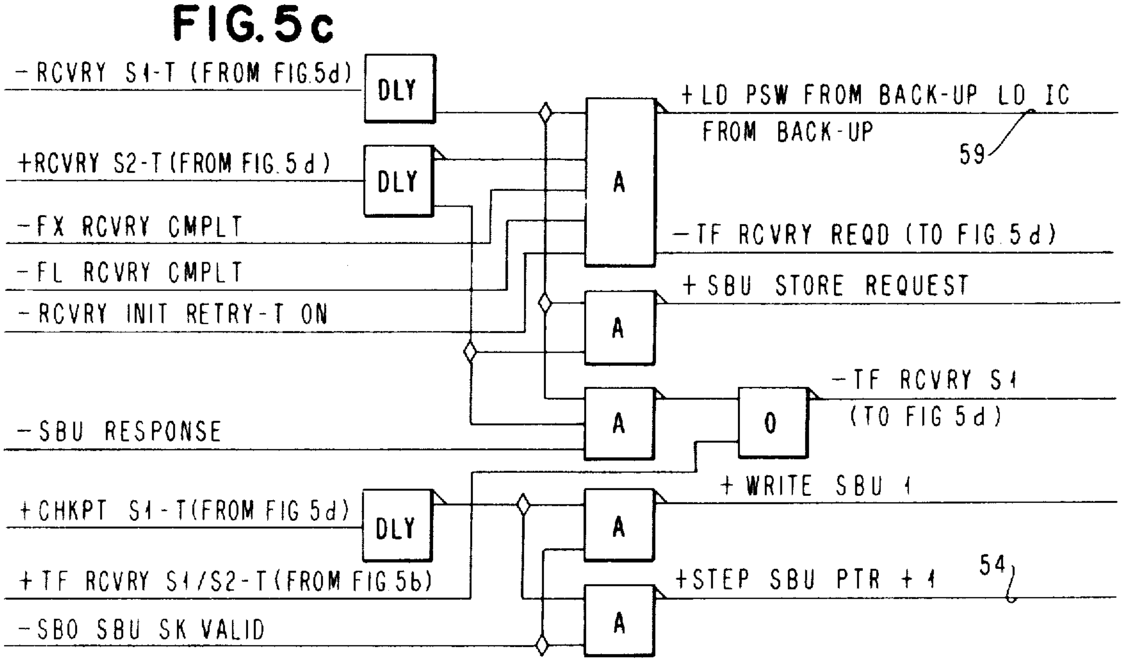
Figure 5D:
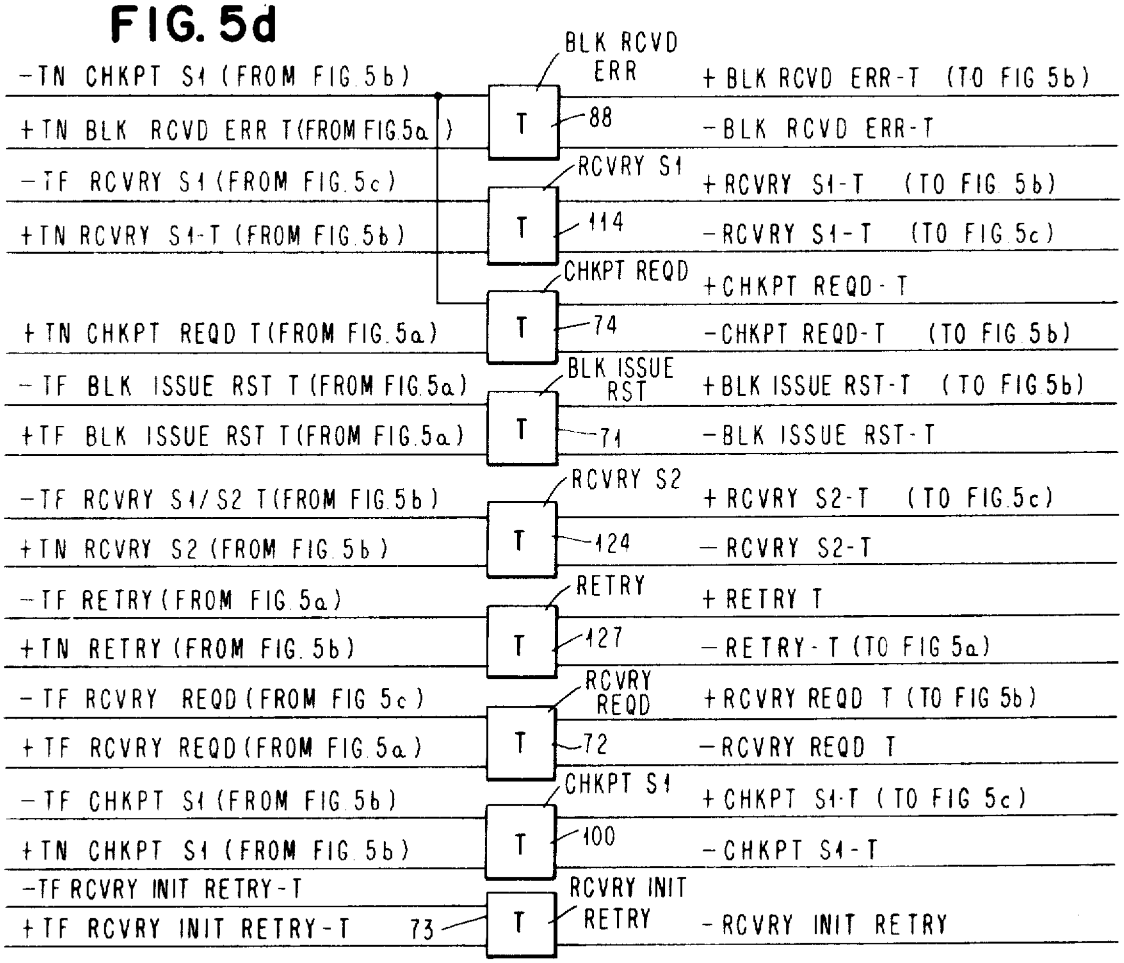

FIGS. 5*a* through 5*d* show detailed AND and OR logic for depicting, in another form, the sequences and logic decisions made in accordance with the discussion of FIGS. 4*a* through 4*e*. All input and output lines have been labeled with terms already discussed and designated in connection with the flow chart representation. The logic is such that yes and no answers to logic decisions are reflected by plus or minus values on the input or output lines of the various logic circuits. Rather than provide a detailed analysis of the logic shown in FIGS. 5*a* through 5*d*, significant signal lines and triggers discussed previously have been labeled with numerical designations given previously. For example, the signal line 65 in FIG. 1 which is effective to decrement the storage backup pointer 34 is shown in FIG. 5*b*. In FIG. 5*d*, all the various triggers mentioned in connection with the discussion of FIGS. 4*a* through 4*e* are shown and have been numbered in accordance with the block designation in the flow charts. The logic which sets or resets these triggers can be traced by various input and output lines which have been labeled as to the figure from which the signal is generated or the figure to which a particular signal is sent.

There has thus been shown in one form of the present invention means for creating a precise data processing system condition. Processing proceeds with the execution of a sequence of program instructions while saving the original contents of only those data registers which are modified during the processing. The invention provides the ability to return the data processing system to the previously established precise state by restoring the contents of data registers which have been modified and return of the data processing system control state to the condition that existed at the time of establishing the precisely known state. In response to either manually or programmed control signals, the previous sequence of instructions can be retried. The retry of the instruction sequence can be on an individual instruction basis, that is out of overlap, or can proceed in an overlap fashion up to a particular point at which time instructions will be executed out of overlap. Further, once recovery to the previous state has been reached, the data processing system may initiate an entirely different instruction sequence in dependence on the condition which caused return to the previously established checkpoint. The retry of a particular instruction sequence in a non-overlapped mode of operation permits a determination to be made of the precise cause of an interrupt or hardware error condition.

What is claimed is:

1. A data processing system including:

a plurality of binary word registering means, including addressable storage means for controlling the reading or storing of data at a location specified by an applied address;

instruction unit means including an instruction address counter and decoding means, connected to said addressable storage means for reading, storing, and processing data including sequences of instructions for controlling the data processing system;

execution unit means responsive to said decoding means for processing data and connected to said addressable storage means for receiving operands from, and for storing operands in, addressed locations of said addressable storage means;

control apparatus distributed between said storage means, said instruction unit means, and said execution unit means, including means signalling a plurality of normal conditions of the system and means signalling a plurality of abnormal conditions of the system during processing of instructions, temporary storage means having transfer paths to and from said storage means;

checkpoint means connected and responsive to said normal condition signalling means, including instruction counter storage means for storing the contents of said instruction address counter identifying a particular instruction occurring subsequent to any one of said normal conditions, and including loading means to transfer to said temporary storage means the original contents of said word registering means into which operands are stored during the period between each said identified instruction; and recovery means connected and responsive to said abnormal condition signalling means, including restoring means to transfer to the previously stored-into ones of said registering means the original contents thereof from said temporary storage means.

2. A data processing system in accordance with claim 1 wherein said recovery means includes:

means to transfer the contents of said instruction counter storage means to said instruction address counter, whereby instruction processing is retried with original data existing at the time of the last identified instruction.

3. A data processing system in accordance with claim 1 wherein said temporary storage means includes:

a plurality of backup registers, each of which stores the original data from said addressable storage means and the applied address which accessed the specified location for storing of data.

4. A data processing system in accordance with claim 3 wherein said temporary storage means includes:

pointer means connected to said backup registers for enabling access to said registers in sequence to transfer the original data and addresses to or from said addressable storage means, said pointer means responding to said normal condition signalling means to be reset to enable access to the first of said backup registers, responding to each control of said addressable storage means for storing of data to increment to the next succeeding one of said backup registers and responding to said abnormal condition signalling means and each control of said addressable storage means for the restoring of data to decrement to the next preceding one of said backup registers.

5. A data processing system in accordance with claim 1 wherein said addressable storage means includes:

a main store with large capacity and slow speed;

a buffer store with small capacity and high speed intermediate said main store and said instruction means and execution means; and storage control means including directory means for responding to applied addresses to cause the data from the most recently addressed storage locations for reading or storing to be stored in said buffer store; and said transfer paths include, means interconnecting said buffer store and said temporary storage means.

6. A data processing system in accordance with claim 1 wherein said temporary storage means includes:

a plurality of backup registers, each one of which is associated with a particular one of said word registering means.

7. A data processing system in accordance with claim 6 wherein each of said backup registers includes:

indicator means;

means interconnected, and responsive, to said loading means for setting said indicator means to indicate which of said backup registers has received the original contents of the associated one of said word registering means; and means responsive to said restoring means and said indicator means for transferring the original contents of the registering means from said registers to the associated one of said word registering means when said indicator means is in the set condition.

* * * * *